(12) United States Patent
Amid et al.

(10) Patent No.: US 9,305,266 B2
(45) Date of Patent: Apr. 5, 2016

(54) OBJECTIVE WEIGHING AND RANKING

(71) Applicant: International Business Machines Corporation, Armonk, NY (US)

(72) Inventors: David Amid, Kiryat Ata (IL); Ateret Anaby-Tavor, Givat Ada (IL); David Boaz, Bahan (IL); Dmitry A Moor, Moscow (RU); Ofer Michael Shir, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 267 days.

(21) Appl. No.: 14/178,331

(22) Filed: Feb. 12, 2014

(65) Prior Publication Data
US 2015/0227848 A1    Aug. 13, 2015

(51) Int. Cl.
    G06N 7/08      (2006.01)
    G06N 7/00      (2006.01)
    G06Q 10/04     (2012.01)

(52) U.S. Cl.
    CPC ............ *G06N 7/005* (2013.01); *G06Q 10/04* (2013.01); *G06N 7/08* (2013.01)

(58) Field of Classification Search
    None
    See application file for complete search history.

(56) References Cited

U.S. PATENT DOCUMENTS

2013/0088729 A1   4/2013   Fu et al.
2013/0197878 A1   8/2013   Fiege et al.

OTHER PUBLICATIONS

Ryu, et al., Pareto Front Approximation With Adaptive Weighted Sum Method in Multiobjective Simulation Optimization, Proceedings of the 2009 Winter Simulation Conference, M. D. Rossetti, R. R. Hill, B. Johansson, A. Dunkin, and R. G. Ingalls, eds. 2009, pp. 623-633.*
Choo et al., "Interpretation of criteria weights in multicriteria decision making", Computers & Industrial Engineering 37, 1999, pp. 527-541.
Marler et al., "Survey of Multi-Objective Optimization Methods for Engineering", Structural and Multidisciplinary Optimization 26, 2004, pp. 369-395.
Triantaphyllou et al., "Multi-Criteria Decision Making: An Operations Research Approach", Encyclopedia of Electrical and Electronics Engineering vol. 15, pp. 175-186, 1998.
Vladimir D. Noghin, "What is the Relative Importance of Criteria and How to Use it in MCDM", Multiple Criteria Decision Making in the New Millennium, Lecture Notes in Economics and Mathematical Systems vol. 507, 2001, pp. 59-68.
V.V. Podinovsky, "Introduction to the Theory of Importance of criteria in multicriteria decision making problems", Fizmatlit 2007 [in Russian]. Also attached please find a brief summary of the book in English.
Hsieh et al., "Fuzzy MCDM approach for planning and design tenders selection in public office buildings", International Journal of project Management vol. 22, Issue 7, Oct. 2004, pp. 573-584.

(Continued)

*Primary Examiner* — Wilbert L Starks

(57) ABSTRACT

A method comprising using at least one hardware processor for: receiving a multi-objective optimization problem; projecting a Pareto frontier of candidate solutions for said multi-objective optimization problem to a hyperplane; decomposing said hyperplane into multiple Voronoi regions each associated with a candidate solution of said candidate solutions; determining a robustness degree for each candidate solution of said candidate solutions, by computing a hypervolume for each region of said multiple Voronoi regions; and ranking said candidate solutions based on the robustness degree.

20 Claims, 7 Drawing Sheets

(56) References Cited

OTHER PUBLICATIONS

Wei et al., "Application of correlation coefficient to interval-valued intuitionistic fuzzy multiple attribute decision-making with incomplete weight information", Knowledge and Information Systems vol. 26 Issue 2, Feb. 2011, pp. 337-349.

Kalinina et al., "Easy-Interactive Ordering of the Pareto Optimal Set with Imprecise Weights", World Academy of Science, Engineering and Technology 76, 2013.

Markus Hartikainen, "Approximation through Interpolation in Nonconvex Multiobjective Optimization", Academic dissertation to be publicly discussed, by permission of the Faculty of Information Technology of the University of Jyväskylä, Dec. 10, 2011.

* cited by examiner

OBJECTIVE WEIGHING AND RANKING

BACKGROUND

In order to encourage decision makers to specify their preferences regarding different objectives in a multi-objective optimization problem and assist them in choosing a solution under uncertainty, the concept of weights and their robustness was introduced. This concept is essential for the decision maker to understand the nature of the selected solution and may lead the decision maker to better understand the compromise associated with the solution. In practice, many of the existing methods are based on the usage of a utility function that combines all the objectives, with their corresponding weights, into one function. However, it has been argued that such approaches suffer from lack of understanding of the weights concept by the decision makers, since the notion of weights in use is often too complex and even counter-intuitive.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a multi-objective optimization problem; projecting a Pareto frontier of candidate solutions for said multi-objective optimization problem to a hyperplane; decomposing said hyperplane into multiple Voronoi regions each associated with a candidate solution of said candidate solutions; determining a robustness degree for each candidate solution of said candidate solutions, by computing a hypervolume for each region of said multiple Voronoi regions; computing a range of weight vectors for each candidate solution of said candidate solutions; and ranking said candidate solutions based on the robustness degree.

There is further provided, in accordance with an embodiment, a computer program product for ranking candidate solutions of a multi-objective optimization problem, the computer program product comprising a non-transitory computer-readable storage medium having program code embodied therewith, the program code executable by at least one hardware processor for: receiving a multi-objective optimization problem; projecting a Pareto frontier of candidate solutions for said multi-objective optimization problem to a hyperplane; decomposing said hyperplane into multiple Voronoi regions each associated with a candidate solution of said candidate solutions; determining a robustness degree for each candidate solution of said candidate solutions, by computing a hypervolume for each region of said multiple Voronoi regions; computing a range of weight vectors for each candidate solution of said candidate solutions; and ranking said candidate solutions based on the robustness degree.

In some embodiments, the method further comprises using said at least one hardware processor for computing said Pareto frontier.

In some embodiments, the method further comprises using said at least one hardware processor for constructing a visualization of said ranking.

In some embodiments, said receiving of said multi-objective optimization problem comprises receiving a description of multiple objectives and a weight associated with each objective of said multiple objectives.

In some embodiments, the method further comprises using said at least one hardware processor for: (a) computing other Voronoi regions based on the received weight associated with each of said objective, and (b) computing one or more intersections between said multiple Voronoi regions and said other Voronoi regions.

In some embodiments, said weight is a weight range.

In some embodiments, the method further comprises using said at least one hardware processor for receiving a desired degree of robustness for the weight associated with each objective of the multiple objectives.

In some embodiments, the Pareto frontier is concave.

In some embodiments, the Pareto frontier is convex.

In some embodiments, the Pareto frontier is continuous.

In some embodiments, the Pareto frontier is discrete.

In some embodiments, said at least one hardware processor comprises two or more hardware processors, and wherein said determining of said robustness degree is performed simultaneously in multiple ones of said two or more hardware processors.

In some embodiments, the program code is further executable by said at least one hardware processor for computing said Pareto frontier.

In some embodiments, said program code is further executable by said at least one hardware processor for constructing a visualization of said ranking.

In some embodiments, said program code is further executable by said at least one hardware processor for receiving a desired degree of robustness for the weight associated with each objective of the multiple objectives.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1A:
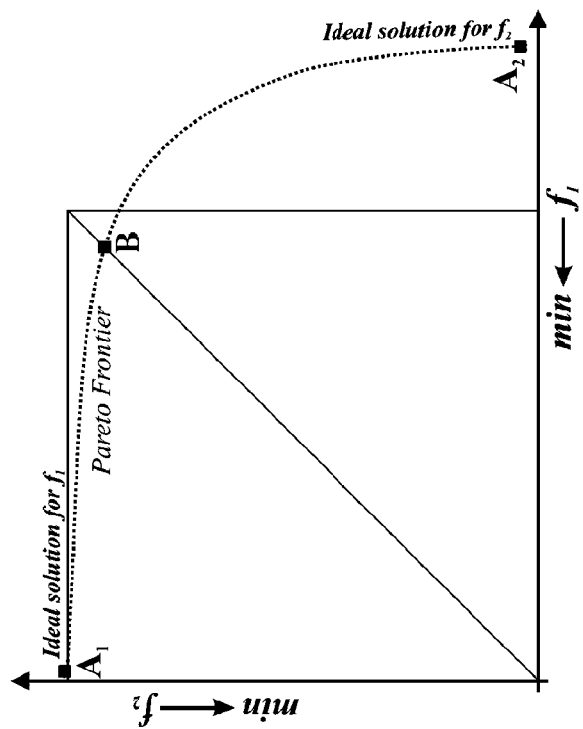
FIG. 1A shows a graph of a convex Pareto Frontier, illustrating a possible scenario where a 50/50 preference is realized.

Disclosed herein is a method (also "algorithm") for interpreting the meaning that underlies self-reported weights in a multi-objective optimization problem.

Advantageously, the present method acts as a filtering system, capable of ranking a multiplicity of mathematically-equivalent solutions to the problem. That is, the method may assist a decision maker in making a choice between a number of solutions which are all Pareto-efficient.

In one embodiment, referred to herein as "explicit", the decision maker may explicitly specify, a priori, his or her preferences with regard to the objectives of the problem. That is, the decision maker may input the desired weights for each alternative objective, in order to discover which alternative solution(s) correspond to this weight allocation. In another embodiment the decision maker may input the desired weights as range of weights for each alternative objective.

In another embodiment, referred to herein as "implicit", the decision maker does not explicitly specify his or her preferences with regard to the possible solutions to the problem. Instead, the method may allow the decision maker to explore and view one or more alternative solutions to the problem, in order to discover the compromise (i.e. trade-off) associated with these particular alternatives, in particular the weights (or ranges of weights) associated with that candidate solution. In other words, the decision maker may wish to verify that the weights associated with his or her choice of solutions indeed correspond to those objective preferences he or she already had in mind.

The method, in some embodiments, may associate each alternative solution with its corresponding profile, expressed as a vector of weights, which represents the closest match with the actual user profile. The term "user profile", as referred to herein, may relate to the importance the decision maker (i.e. the user) assigns to the different objectives. This is the profile that would have been elicited had the decision maker been required to express preferences in terms of a weights vector prior to making a decision.

The method, in some embodiments, may be universal and able to associate each alternative solution with a set of weights, regardless of the Pareto Frontier geometry (concave or convex, continuous or discrete).

In some embodiments, the use of the weights vector by the method is intuitively clear and easily interpreted by the decision maker. The method may cope with uncertainty as the decision maker specifies preferences. Experiments conducted by the inventors corroborate the method's superiority over prior art linear utility (LU) approach, at least in some aspects.

The present method may be applicable, for example, to the disciplines of artificial intelligence, decision analysis, operations research (OR) and/or the like. It may aid in industrial, economic and various other multi-objective optimization problems.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a hardware processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present method, also termed the Targeted Cartesian Point (CP) method, is essentially an approach devised for interpreting the meaning of weight vectors prescribed by a decision maker. Unlike other methods, the present approach is not utility-based. Instead of focusing on the aggregative importance (namely—the aggregate utility value), the present method relies on interpreting the weights vector as an importance ratio between the multiple objectives.

Therefore, the present approach implies that when the decision maker is examining a decision alternative, they are in fact estimating how much more important one objective is than the other, and comparing it to their preferences. In short, they always have a preferred ratio of importance between the different objectives. This leads to the crucial argument that the decision maker associates the weights with a particular Cartesian point within the objective space. More formally, within the Cartesian objective space, $\mathcal{Y} = \mathbb{R}^m$, we consider the hyperplane $\mathcal{P}_m$ that comprises all the normalized vectors in $\mathbb{R}^m$:

$$\mathcal{P}_m = \{\vec{y} \in \mathcal{Y} \; \Sigma_{i=1}^m y_i = 1\}$$

Figure 1B:
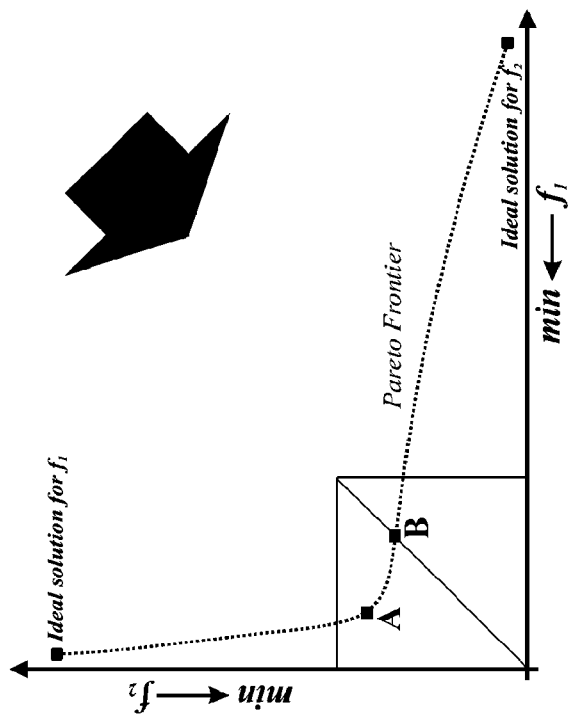
FIG. 1B shows a graph of a concave Pareto Frontier, illustrating another possible scenario where a 50/50 preference is realized.

The Cartesian perspective features the following technical question: What is the point on $\mathcal{P}_m$ that is targeted by the decision maker? This could be mathematically translated, for example, to the question: What is the point on $\mathcal{P}_m$ where the line segment $t \cdot \vec{f}^{(k)}$ intersects (where t is a free-parameter). FIGS. 1A-B illustrate the difference between the proposed approach and a linear utility approach.

Figure 6:
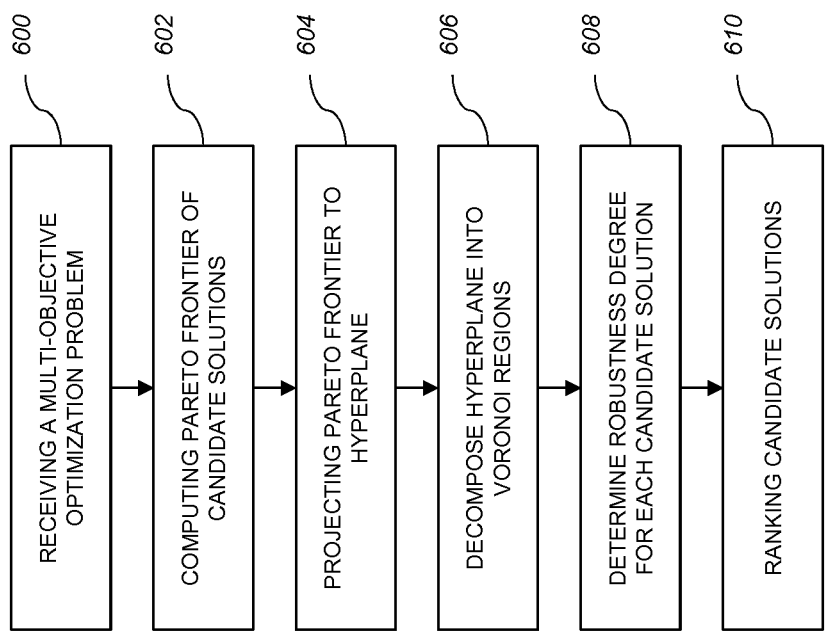
FIG. 6 shows a flow chart of a method according to a cartesian point approach.

FIG. 6 is a flow chart of a method according to the CP approach. In a step 600, a multi-objective optimization problem is received from a user. This may include receiving information as to multiple possible objectives, such as the desirability to minimize or maximize each individual objective. The received information may differ based on the embodiment utilized—"explicit" or "implicit", as discussed above.

Consider, as an example, a conflict between environmental and business interests ("objectives") that is brought for legal arbitration at a state court. The court rules to obtain the best possible set of alternatives and to select the 50/50 solution amongst them.

In a step 602, a Pareto Frontier of candidate solutions to the multi-objective optimization problem is computed, using techniques known in the art.

As an alternative to step 602, the Pareto Frontier may be pre-provided as input, and not computed in the course of the present method.

FIGS. 1A-B illustrates two scenarios, one of a convex Frontier (FIG. 1A), versus a second concave Frontier (FIG. 1B). In the former scenario, had a utility function with $w_1 = w_2 = 0.5$ been used, solution A would have been selected since it is the minimizer of the linear utility function. However, if the Cartesian Point approach is used, it will identify solution B as the 50/50 point—reflecting a meet-in-the-middle realization of the court's rule. In the latter scenario, solution $A_1$ would be selected with a $w_1 = w_2 = 0.5$ linear utility function, versus solution B with the Cartesian Point approach.

Figure 2:
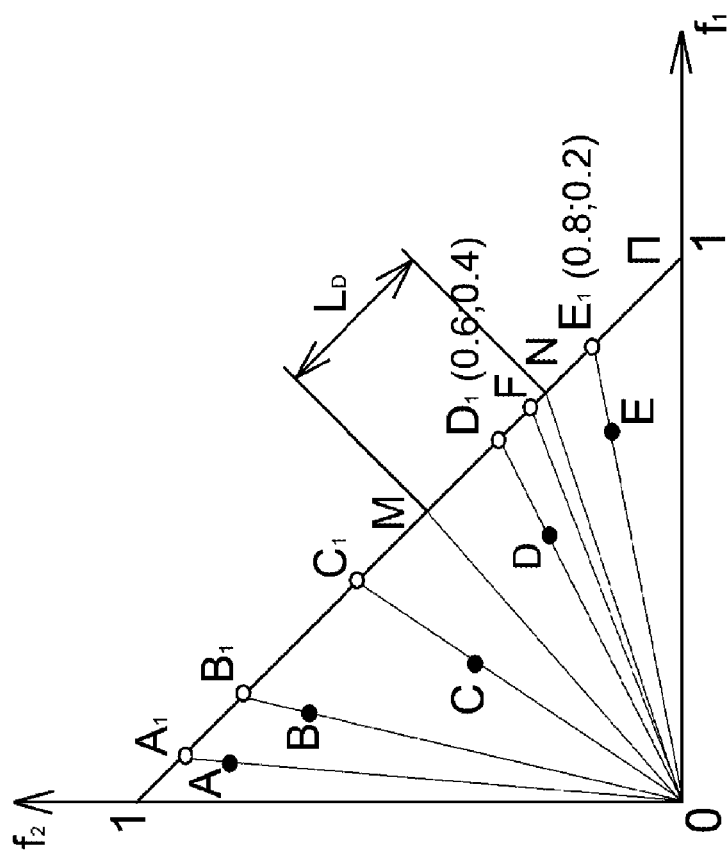
FIG. 2 shows a graph illustrating coordinates of projections of the points A, B, C, D and E from a Pareto Frontier to a hyperplane $\Pi$.

FIG. 2 illustrates the CP approach in an elementary, exemplary case of two objectives. The Pareto Frontier is denoted by the set of points: A, B, C, D, and E. The CP approach asserts that for each point on the Frontier there exists a projection on the hyperplane $\Pi$, such as the points $A_1$, $B_1$, $C_1$, $D_1$, $E_1$, that represent the importance criteria. Returning now to FIG. 6, in a step 604, the Pareto Frontier is projected to the hyperplane $\Pi$.

For example, consider the decision alternative E: the importance of $f_1$ is four-fold larger than the importance of $f_2$ ($w_1 = 0.8$ vs. $w_2 = 0.2$). An algorithm for computing the weights of objectives for every point of the Pareto Frontier, in accordance with some embodiments, is described as Algorithm 1.

Algorithm 1:

| | computeWeights (Frontier F) |
|---|---|
| 1: | n ← numberOfObjectives |
| 2: | for i = 1 . . . \|F\| do |
| 3: | for j = 1 . . . n do |
| 4: | $W_{Proj[i][j]} \leftarrow \dfrac{F[i][j]}{\Sigma_{j=1}^n F[i][j]}$ |
| 5: | end for |
| 6: | end for |
| 7: | for i = 1 . . . \|F\| do |
| 8: | for j = 1 . . . n do |
| 9: | $W_{[i][j]} \leftarrow \dfrac{1 - W_{Proj[i][j]}}{\Sigma_{j=1}^n 1 - W_{Proj[i][j]}}$ |
| 10: | end for |
| 11: | end for |
| 12: | return $W_{[i][j]}, W_{Proj}$ |

In many multi-objective problems, the resulting Pareto Frontier is discrete, posing a challenge when matching decision alternatives to the user preferences. For example, following the Pareto Frontier in FIG. 2, a 69/31 preference of importance between objectives (point F) is assumed. Unfortunately, there is no specific decision alternative on the Frontier that fits this exact preference. Therefore, the proposed method has to be augmented with the concept of robustness, which is meant to associate an exclusive range of weight vectors with each decision alternative.

In FIG. 2, coordinates of projections of the points A, B, C, D and E from the Pareto Frontier to the hyperplane $\Pi$ define the importance of the corresponding criteria for these solutions. $L_D$ defines the robustness degree of weights for the point D. If the decision maker specifies the preferences as 69/31 (the point F on this plot), then the solution D should be suggested.

In this case, the preference of 69/31 (point F) would be associated with the decision alternative D. The reason for this association is that the corresponding line between the origin and point F is closer to the line $0D_1$ than to the line $0E_1$ (the notion of angle between lines is used to determine which line is closer to another). Alternatively, the distance between points F and $D_1$ is smaller than any other distance from point F to the points $E_1$, $C_1$, $B_1$ or $A_1$. This means the decision maker is more likely to search for a solution in the 0MN region. Since this region contains only point D, just this option should be proposed to the decision maker. Such reasoning leads to the understanding that the robustness degree for this particular problem should be equal to the length $L_D$ of the interval between points M and N.

Back to FIG. 6, in a step 606, the hyperplane Π is decomposed (also "divided" or "partitioned") into Voronoi regions. If a special set of point-seeds is provided, the region consisting of all the points that are closer to one particular seed is referred to, in the art, as a Voronoi region. This concept may be generalized to any number of objectives as follows: for an objective space of any dimension, one can find projections of the Pareto Frontier to the hyperplane Π in that space. Closer examination of the previous example reveals that the region between points M and N consists of points that are closer to the point $D_1$ than to any other point from Π, hence it is a Voronoi region for this point. Given that the concept of Voronoi region is defined for any dimensional space, the problem of computing the robustness degree is reduced to the problem of computing the hypervolume of the corresponding Voronoi region.

Algorithm 2 summarizes this as follows: First, the algorithm calculates for each decision alternative an exclusive Vornoi region (Line 3) by decomposing the Π hyperplane into Voronoi regions. Since the decomposition is always done in a space of dimension m−1, the rotation of the hyperplane is required (Line 2, see also Algorithm 3). Next, in lines 5-8, Algorithm 2 computes the minimum and maximum weight per objective based on the Voronoi region (see details in Algorithm 4).

In FIG. 6, in a step 608, a robustness degree for each candidate solution us determined, by computing the hypervolume for each Voronoi region. In Algorithm 2, as shown, the hypervolume of the region is calculated; this is a scalar metric that is used to represent the robustness degree of the decision alternative (see details in Algorithm 5).

Algorithm 2 (Pseudo-Code for Computing an Exclusive Range of Weight Vectors Per Each Decision Alternative):

```
correspondcomputeRobustnessDegreeCartesian (Frontier F)

1:    [W; W_Proj] ← computeWeights(F)
2:    W_Proj ← rotateWeights (W_Proj)
3:    V_or ← VoronoiDecomposition (W_Proj)
4:    hyperVolume ← zeros (|V_or|)
5:    for i = 1 . . . (|V_or| do
6:        [minRange[i, :]; maxRange[i, :]] ← computeRange(V_or[i])
7:        hyperVolume[i] ← computeHypervolume(V_or[i])
8:    end for
9:    RD ← hyperVolume
10:   return W, RD, minRange, maxRange
```

Algorithm 3 (Pseudo-code for rotating a hyperplane):
rotateWeights (Weights W)

```
1:    n ← numberOfObjectives
2:    for j = 1 . . . n − 1 do
3:        W ← moveHyperplaneToOrigin(W)
4:        normal ← computeNormalForHyperplane(W)
```

-continued

5: $\alpha \leftarrow \arctan\left(\dfrac{\text{normal }[j]}{\text{normal }[j+1]}\right)$ 6: $M \leftarrow I_n \{/* \text{ Identity matrix }*/\}$ 7: $M[j:j+1] \ [j:j+1] \leftarrow \begin{pmatrix} \cos(\alpha) & -\sin(\alpha) \\ \sin(\alpha) & \cos(\alpha) \end{pmatrix}$

```
8:        for j = 1 . . . |W| do
9:            W [j, :] ← M • W[i, :]^T
10:       end for
11:   end for
12:   return W[i][j]
```

Algorithm 4 (Pseudo-Code for Computing the Range of Weight Vectors Per Decision Alternative):

```
computeRange (VoronoiRegion V R)
1: vertices ← getVertices(V R)
2: min Values ← min (vertices){/*Get vector consisting of minimum
values among all components*/}
3: max Values ← max (vertices){/*Get vector consisting of maximum
values among all components*/}
4: return minValues, maxValues
```

Algorithm 5 (Pseudo-Code for Computing the Robustness Degree Per Decision Alternative):

```
computeHypervolume (VoronoiRegion V R)
1:       for j = 1 ... | V R | do
2:           TES ← buildTriangulation (V R)
3:           for j = 1 ... | T E S | do
4:               hv ← hv + computeHV(TES[i]) {/* Compute hv of
                 simplex as determinant*/}
5:           end for
6:       end for
7: return hv
```

In a step 610 of FIG. 6, the scalar metric, namely—the hypervolume of each Voronoi region, is used for ranking the candidate solutions to the multi-objective optimization problem. The candidate solutions may be ranked in accordance with the volume of their respective Voronoi regions. Generally, the smaller the volume is, the higher the candidate solution is ranked. The ranking may include displaying, for example on a computer monitor, an ordered list of the ranked candidate solutions.

Optionally, the candidate solutions may be visualized, within the framework of a graphical user interface (GUI) operable in accordance with the present method. In some embodiments, the candidate solutions are visualized according to one or more of the visualization techniques discussed in U.S. patent application Ser. No. 13/597,264 to Amid et al., filed Aug. 29, 2012.

Figure 7:
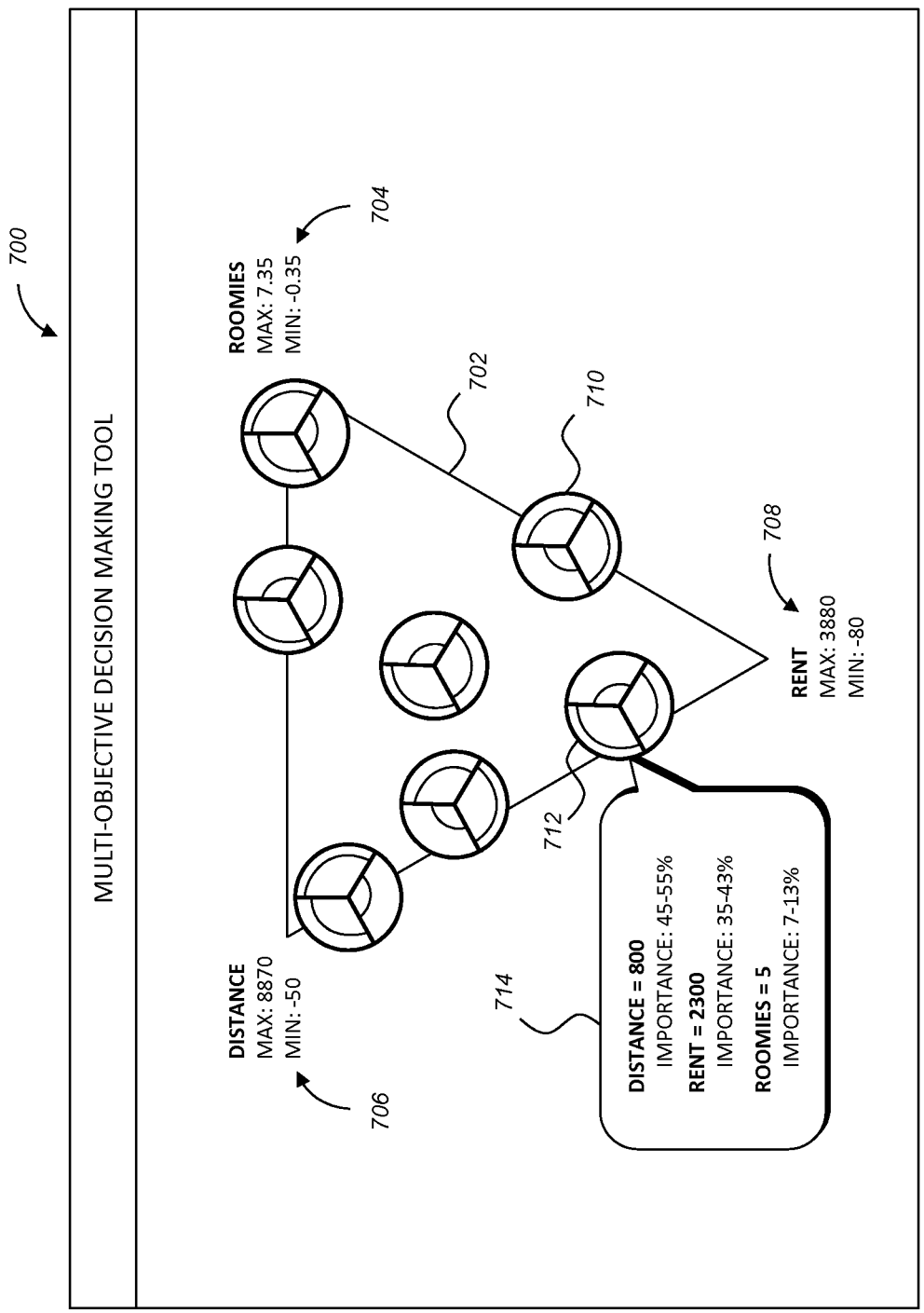
FIG. 7 shows an exemplary graphical user interface (GUI) for visualizing an implicit embodiment.

Reference is now made to FIG. 7, which shows an exemplary graphical user interface (GUI) 700 for visualizing the "implicit" embodiment. GUI 700 may visualize candidate solutions of a multi-objective optimization problem, by way of displaying a polygon whose number of vertices corresponds to the number of objectives in the problem. In this example, a triangle 702 is displayed, to visualize a three-objective problem. The problem at hand is to suggest a suitable residence for a user. The three objectives at the vertices of triangle 702 are a number of roommates ("roomies") 704 sharing the residence, a distance 706 of the residence from a geographic point of interest, and an amount of rent 708 asked for the residence.

At each of the vertices, the optional "min" and "max" values denote the range of values that objective has across the Pareto frontier.

Candidate solutions to the problem may be displayed, for example, as circles, such as circles 710 and 712. Each such circle may be divided into a number of slices, corresponding to the number of objectives. In this example, each of circles 710 and 712 is divided into three slices. The weight of each objective in a candidate solution may be visualized as an arc in the respective slice, whose radius corresponds to the relative weight.

According to this "implicit" embodiment, the user may select a candidate solution such as by hovering over it or clicking on it. Then, the values that solution has on the Pareto fronties, as well as the weight (or weight range) associated with that solution, may be displayed. For example, this display may be in the form of a tooltip 714, with respect to a selection of the solution of circle 712.

Figure 8:
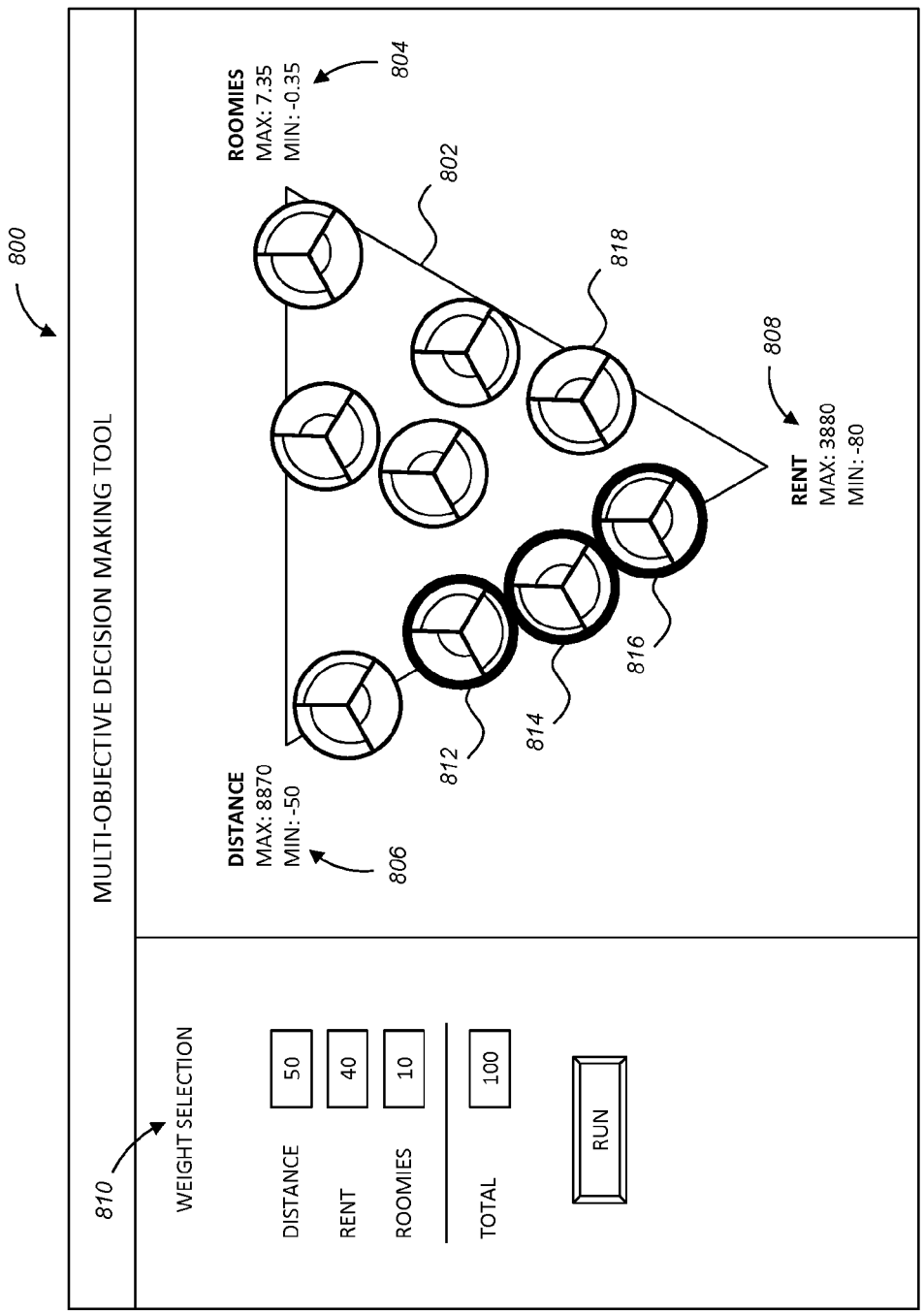
FIG. 8 shows an exemplary graphical user interface (GUI) for visualizing an explicit embodiment.

Reference is now made to FIG. 8, which shows another exemplary GUI 800 for visualizing the "explicit" embodiment. Similar to GUI 700 (FIG. 7), GUI 800 visualizes candidate solutions of the residence selection problem, by way of displaying a triangle 802. The three objectives at the vertices of triangle 802 are, as before, a number of roommates ("roomies") 804 sharing the residence, a distance 806 of the residence from a geographic point of interest, and an amount of rent 808 asked for the residence.

Initially, when GUI 800 is displayed, it may show triange 802 and a plurality of candidate solutions. As before, solutions may be represented by circles, such as circles 812, 814, 816 and 818.

The user may then be prompted to allocate a weight (or a range of weights) to each of the objectives. For example, a weight selection pane 810 may be shown, enabling the user to enter weights. Upon clicking a "run" button or otherwise confirming the entry of the weights, GUI 800 executes the present method, and displays its results by highlighting or otherwise indicating which of the candidate solutions are ranked the highest. In this example, circles 812, 814 and 816 are highlighted, meaning that they represent the highest-ranking solutions.

Figure 4:
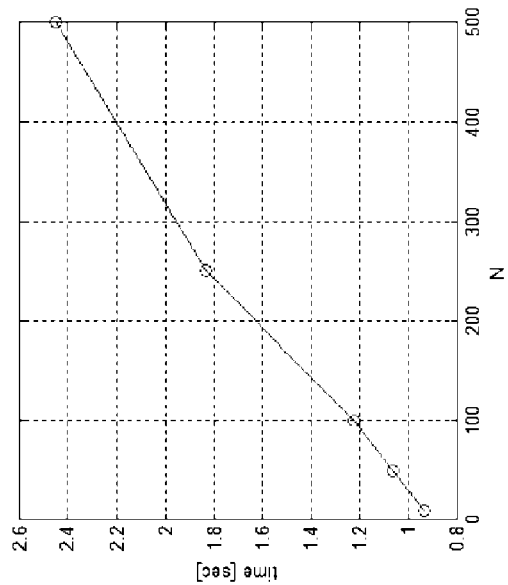
FIG. 4 shows a graph illustrating the time needed for computing the weights for all the points of a three-dimensional Pareto Frontier as a function of the number of points on the Frontier.

The computational complexity of the present approach will now be described. Let N denote the number of points in the Pareto Frontier, and let m denote the number of objectives. Given Algorithm 2, it is evident that exactly one iteration of computing the hypervolume of a Voronoi region is performed per each one of the points in the Pareto Frontier. The time needed for each iteration seemingly depends upon the number of vertices of the corresponding region. One may assume that this number is approximately the same for every Voronoi region. Following this rationale, the complexity of the present algorithm may be estimated as O(N). Computational experiments with three objective problems, performed by the inventors, corroborate this estimation. See FIG. 4, which illustrates the time needed for computing the weights for all the points of a three-dimensional Pareto Frontier as a function of the number of points on the Frontier. The experiment was carried out on a machine with an Intel i7 CPU with four processors at 2.20 GHz.

However, the time needed for a single iteration of the algorithm increases dramatically as the number of objectives rises. This may be explained by the complexity of the underlying geometrical algorithms used by the present method, which run longer on higher dimensional spaces. As an estimation for a single iteration, let us denote by $n_v$ the average number of vertices of a Voronoi region. It is clear that as $n_v$ increases, it takes longer to triangulate the region and compute its hypervolume. The computational experiments show that the dependency of $n_v$ upon the number of objectives resembles the curve depicted in FIG. 3.

Figure 3:
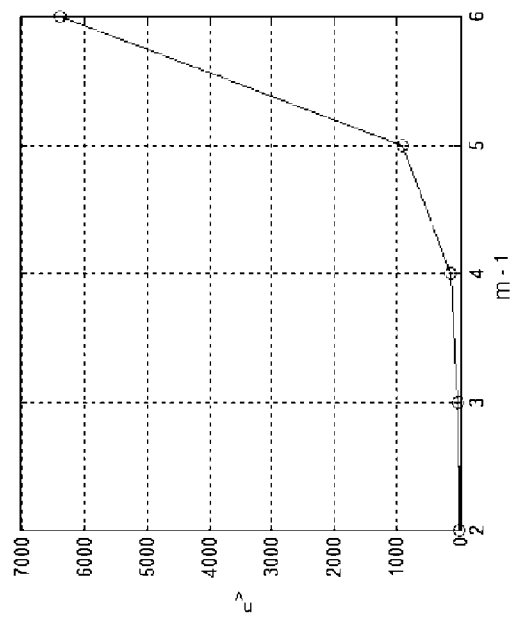
FIG. 3 shows a graph illustrating the dependency of the number of vertices of a single Voronoi region upon the number of objectives.

FIG. 3, to which reference is now made, illustrates the dependency of the number of vertices of a single Voronoi region upon the number of objectives. When comparing the plot for the three-objective problem presented in FIG. 4 to the trend illustrated in FIG. 3, one can expect it to take much longer to compute the weights for all the points of higher dimensional Pareto Frontiers. It should be noted that the proposed calculation can be implemented in a parallel computation, executing the evaluation steps per each point in an independent computing unit, such is using separate cores of a multi-core CPU (Central Processing Unit, also "hardware processor") and/or separate CPUs.

Experimental Results

This section evaluates the method of the present embodiments (CP), by comparing it with the prior art Linear Utility (LU) method.

A 2×3×2 (computation method, visualization type, problem complexity) mixed experimental design was carried out to test for the differences in choice accuracy of the computation methods. This design included a manipulation of the weight computation method (i.e., CP vs. LU) as the first factor. The hypothesis tested for is that on average, both methods yield a similar level of accuracy when compared with the self-reported weights. To account for additional possible background factors, a manipulation of the type of visualization used to facilitate the decision making was employed, as well as two degrees of problem complexity.

For the manipulation of visualization type, each participant was randomly assigned to one of three multivariate visualization groups:
1. Parallel Coordinates (PC; see Isenberg, A. and Dimsdale, B. *Parallel Coordinates: a Tool for Visualizing Multi-Dimensional Geometry*. Im Proceedings of the $1^{st}$ conference on Visualization '90, VIS '90, IEEE Computer Society Press (Los Alamitos, Calif., USA, 1990), 361-378);
2. Self Organizing Map for Multi-Objective Pareto Frontiers (SOMMOS; see Chen, S., Amid, D., Shir, O., M., Boaz, D., Schreck, T., Limonad, L., and Anaby-Tavor, A., *Self-Organizing Maps for Multi-Objective Pareto Frontiers*. In Proceedings of IEEE Pacific Visualization, IEEE Press (2013); and
3. A plain tabular representation.

For the manipulation of problem complexity, each participant was asked to make two consecutive choices, corresponding to two sizes of Pareto frontiers: 15 and 65 solution alternatives. Implied from this design, the experiment also tested for the differences in accuracy between each of the two additional factors, and for all possible interactions among them. The order in which the two problems were presented to each participant was counter balanced across participants.

Measurements:

The manipulation for each of the three independent variables was inherent in the experimental design. To determine the degree of choice accuracy as the dependent variable, each computation method was used to calculate its corresponding weights. This was followed by a distance computation with respect to the self-reported weights, denoted by $d(\vec{w}_p, \vec{w})$, where $\vec{w}_p$ is the vector of weights specified by a participant, and $\vec{w}$ is the vector of weights computed by one of the methods. The smaller the distance, the closer the model (i.e., CP or LU) to the participant's self-reported preferences.

Procedure:

In the beginning of the experiment, each participant was given a 15 minute computer-based training session about multi-criterion decision making and the use of the corresponding visualization tool. The training was followed by a short quiz with 10 questions to ensure they were adequately qualified to complete the experimental task. Facilitated by the visualization means, each participant was then required to complete two decision making tasks. Each task presented a different set of apartments to be examined according to three objectives: distance from the university, number of roommates, and price. The participants were instructed to choose a single apartment as their most desired choice. It should be mentioned that there were no dominated alternatives in the dataset and the corresponding Pareto Frontier was convex. Following the two choices, participants were then asked to explicitly report their weights regarding the three objectives reflecting their previous choices. Intentionally, participants were not informed about the possible interpretations for these weights, aside from instructing them to simply indicate these weights in a form of three non-negative scores that sum to one. These results were used as the intuitive self-reported profile in our analysis.

Participants:

A group of 89 undergraduate students volunteered to take part in our experiment. To motivate performance, a monetary prize was offered to the 10% topmost performers. Participants were explained that performance scores will reflect the level of consistency among all choices with respect to the self-reported preferences. All participants were senior engineering students who were familiar with the problem domain presented. Hence, the participants might be considered experts in the problem they were trying to solve. After eliminating students who failed the quiz (i.e., 3 in total who scored below a predefined threshold score of 70%), and 3 additional questionnaires that were improperly filled out, 83 useful responses were compiled in the analysis.

Reliability:

It was expected that individual choices would reflect consistency in preferences across the two levels of complexity. This was due to the rational that individual preferences do not change as the number of choices presented to the decision maker is manipulated. Hence, the reliability of responses was evaluated using Pearson correlations. The results are illustrated in Table 2. As marked in bold, weight-wise correlations exist only between the corresponding weights that were computed by the CP method. The underlined correlations indicate weight-wise inconsistencies across the two levels of complexity for the LU method. It may be inferred that, regardless of its accuracy, the LU method is sensitive to the size of the frontier.

TABLE 1

Descriptive Statistics

| Method | Size | VIZ PC | | | SOMMOS | | | Table | | | Total | | |
|---|---|---|---|---|---|---|---|---|---|---|---|---|---|
| | | M | SD | n | M | SD | n | M | SD | n | M | SD | n |
| CP | BIG | 0.25 | 0.10 | 29 | 0.26 | 0.16 | 25 | 0.27 | 0.13 | 29 | 0.26 | 0.13 | 83 |
| | SMALL | 0.24 | 0.10 | 29 | 0.27 | 0.16 | 25 | 0.26 | 0.14 | 29 | 0.26 | 0.13 | 83 |
| | Total | 0.24 | 0.10 | 58 | 0.27 | 0.16 | 50 | 0.27 | 0.13 | 58 | 0.26 | 0.13 | 166 |
| LU | BIG | 0.32 | 0.16 | 29 | 0.31 | 0.18 | 25 | 0.34 | 0.15 | 29 | 0.32 | 0.16 | 83 |
| | SMALL | 0.42 | 0.16 | 29 | 0.42 | 0.19 | 25 | 0.46 | 0.16 | 29 | 0.44 | 0.17 | 83 |
| | Total | 0.37 | 0.17 | 58 | 0.37 | 0.19 | 50 | 0.40 | 0.17 | 58 | 0.38 | 0.17 | 166 |
| Total | BIG | 0.28 | 0.14 | 58 | 0.28 | 0.17 | 50 | 0.31 | 0.14 | 58 | 0.29 | 0.15 | 166 |
| | SMALL | 0.33 | 0.16 | 58 | 0.35 | 0.19 | 50 | 0.36 | 0.18 | 58 | 0.35 | 0.18 | 166 |
| | Total | 0.31 | 0.15 | 116 | 0.32 | 0.18 | 100 | 0.33 | 0.16 | 116 | 0.32 | 0.17 | 332 |

TABLE 2

Reliability Measurement

| SIZE | METHOD | Weight | BIG CP | | | MIP | | |
|---|---|---|---|---|---|---|---|---|
| | | | w1 | w2 | w3 | w1 | w2 | w3 |
| SMALL | CP | w1 | .764 | −.404 | −.562 | .730 | −.455 | −.547 |
| | | w2 | −.319 | .473** | −.020 | −.332 | .462** | .004 |
| | | w3 | −.628 | .023 | .720** | −.572 | .098 | .686** |
| | LU | w1 | −.097 | .313* | −.147 | <u>−.169</u> | .330** | −.096 |
| | | w2 | .155 | −.207 | −.010 | .191 | <u>−.233*</u> | −.031 |
| | | w3 | −.098 | −.192 | .276* | −.036 | −.176 | <u>.223</u> |

Data Preparation:

Prior to running the statistical analysis, the data was coded and verified using an automated script to scan for inadequate responses that did not match the original alternatives presented. A first scan identified 29 erroneous choices. These choices were verified against the original hand-written questionnaires and re-coded wherever it was possible to resolve the mismatch. A second scan identified only three erroneous choices that could not be resolved. Consequently, these responses were dropped.

Statistical Analysis:

A three-way ANOVA (analysis of variance) was conducted for testing for the differences in accuracy measurements between the different groups.

Results:

Descriptive statistics with respect to the three factors of method, size, and visualization type, are illustrated in Table 1.

Table 3 illustrates the results of the analysis. For brevity, only significant results (i.e., α<0.05) are reported. As can be observed, the results indicate two significant main effects. However, more importantly for the interpretation, the results show a significant interaction between the model (i.e., computation method) and the size of the Pareto Frontier (i.e., problem complexity). Correspondingly, post-hoc analysis employing pairwise comparisons was pursued.

TABLE 3

ANOVA Results:

| Factor | Sum Sq. | d.f. | Mean Sq. | F | p-value |
|---|---|---|---|---|---|
| Model | 1.14 | 1 | 1.14 | 50.11 | 0 |
| Size | 0.26 | 1 | 0.26 | 11.38 | 0.001 |
| Model × Size | 0.27 | 1 | 0.27 | 12.24 | 0.001 |

Figure 5:
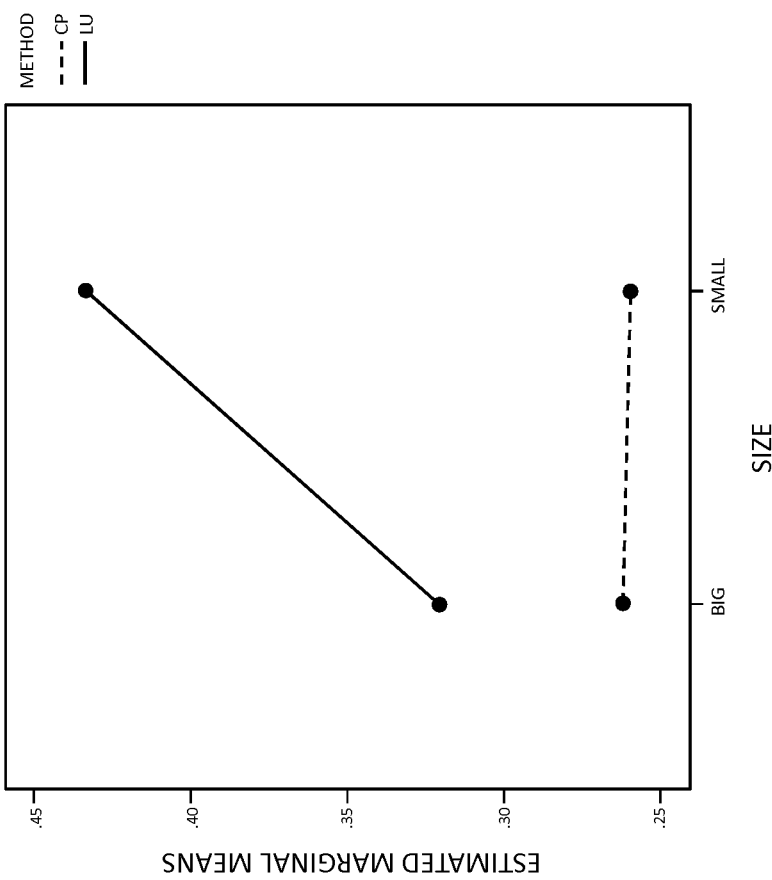
FIG. 5 shows a graph illustrating interaction between the model and size factors.

Post-Hocs:

FIG. 5 illustrates the interaction between the two factors of model and size. The Cartesian Point approach seems indifferent to the size of the Pareto Frontier, while the Linear weights works better for larger Pareto Frontiers. Following the significant interaction, post-hoc analyses was performed using the Fisher LSD (Least Significant Difference) tests, as reported in Table 4. It is apparent that the CP method is significantly more accurate than the LU method, regardless of the size of the Pareto Frontier. Consistent with the reliability tests, the CP approach is not sensitive to the size of the Pareto Frontier while the LU approach is.

TABLE 4

Pairwise Comparisons Between the Methods

| | CP | | | LU | | | |
|---|---|---|---|---|---|---|---|
| | M | SD | n | M | SD | n | p-value |
| Small | 0.264 | 0.13 | 83 | 0.457 | 0.15 | 83 | 0 |
| Big | 0.274 | 0.12 | 83 | 0.336 | 0.15 | 83 | 0.011 |

Based on the results from the empirical evaluation, it is possible to refute the main null hypothesis according to which both computation methods are equally accurate. Specifically, the experiment conducted provides clear evidence that the CP method is significantly more accurate than the LU method when compared with the self-reported preferences. These results hold independent of the multivariate visualizations that were used by the various groups, and remain valid across both levels of complexity. Finally, it was also observed that unlike the CP method, the LU method is a non-reliable measurement, being sensitive to the degree of problem complexity.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising using at least one hardware processor for:
    receiving a multi-objective optimization problem;
    projecting a Pareto frontier of candidate solutions for said multi-objective optimization problem to a hyperplane;
    decomposing said hyperplane into multiple Voronoi regions each associated with a candidate solution of said candidate solutions;
    determining a robustness degree for each candidate solution of said candidate solutions, by computing a hypervolume for each region of said multiple Voronoi regions;
    computing a range of weight vectors for each candidate solution of said candidate solutions; and
    ranking said candidate solutions based on the robustness degree.

2. The method according to claim 1, further comprising using said at least one hardware processor for computing said Pareto frontier.

3. The method according to claim 1, further comprising using said at least one hardware processor for constructing a visualization of said ranking.

4. The method according to claim 1, wherein said receiving of said multi-objective optimization problem comprises receiving a description of multiple objectives and a weight associated with each objective of said multiple objectives.

5. The method according to claim 4, further comprising using said at least one hardware processor for: (a) computing other Voronoi regions based on the received weight associated with each of said objective, and (b) computing one or more intersections between said multiple Voronoi regions and said other Voronoi regions.

6. The method according to claim 4, wherein said weight is a weight range.

7. The method according to claim 1, further comprising using said at least one hardware processor for receiving a desired degree of robustness for the weight associated with each objective of the multiple objectives.

8. The method according to claim 1, wherein the Pareto frontier is concave.

9. The method according to claim 1, wherein the Pareto frontier is convex.

10. The method according to claim 1, wherein the Pareto frontier is continuous.

11. The method according to claim 1, wherein the Pareto frontier is discrete.

12. A computer program product for ranking candidate solutions of a multi-objective optimization problem, the computer program product comprising a non-transitory computer-readable storage medium having program code embodied therewith, the program code executable by at least one hardware processor for:

receiving a multi-objective optimization problem;

projecting a Pareto frontier of candidate solutions for said multi-objective optimization problem to a hyperplane;

decomposing said hyperplane into multiple Voronoi regions each associated with a candidate solution of said candidate solutions;

determining a robustness degree for each candidate solution of said candidate solutions, by computing a hypervolume for each region of said multiple Voronoi regions;

computing a range of weight vectors for each candidate solution of said candidate solutions; and ranking said candidate solutions based on the robustness degree.

13. The computer program product according to claim 12, wherein the program code is further executable by said at least one hardware processor for computing said Pareto frontier.

14. The computer program product according to claim 12, wherein said program code is further executable by said at least one hardware processor for constructing a visualization of said ranking.

15. The computer program product according to claim 12, wherein said receiving of said multi-objective optimization problem comprises receiving a description of multiple objectives and a weight associated with each objective of said multiple objectives.

16. The computer program product according to claim 15, wherein said weight is a weight range.

17. The computer program product according to claim 12, wherein said program code is further executable by said at least one hardware processor for receiving a desired degree of robustness for the weight associated with each objective of the multiple objectives.

18. The computer program product according to claim 11, wherein the Pareto frontier is concave.

19. The computer program product according to claim 11, wherein the Pareto frontier is convex.

20. The computer program product according to claim 11, wherein the Pareto frontier is discrete.

* * * * *